United States Patent [19]

Bohle

[11] Patent Number: 4,601,218

[45] Date of Patent: Jul. 22, 1986

[54] GEARING UNITS FOR USE WITH MINING APPARATUS

[75] Inventor: Werner Bohle, Lüdinghausen, Fed. Rep. of Germany

[73] Assignee: Gewerkschaft Eisenhutte Westfalia, Lunen, Fed. Rep. of Germany

[21] Appl. No.: 622,733

[22] Filed: Jun. 20, 1984

[30] Foreign Application Priority Data

Jun. 28, 1983 [DE] Fed. Rep. of Germany ....... 3323250

[51] Int. Cl.$^4$ .......................... F16H 3/44; F16D 7/02
[52] U.S. Cl. ..................................... 74/785; 192/56 F; 192/150
[58] Field of Search .................. 74/785, 731; 192/150, 192/56 F; 188/170

[56] References Cited

U.S. PATENT DOCUMENTS

| | | | |
|---|---|---|---|
| 2,436,947 | 3/1948 | Vergne | 192/56 F |
| 2,790,340 | 4/1957 | Cross | 192/150 X |
| 2,791,920 | 5/1957 | Ray | 192/150 X |
| 3,078,750 | 2/1963 | Haywood et al. | 192/150 X |
| 3,613,721 | 10/1971 | Horn | 192/150 X |
| 4,245,526 | 1/1981 | Fruin et al. | 192/150 X |

FOREIGN PATENT DOCUMENTS

| | | | |
|---|---|---|---|
| 1169955 | 1/1959 | France | 192/150 |
| 2088442 | 6/1982 | United Kingdom | 192/150 |

Primary Examiner—Kenneth J. Dorner
Assistant Examiner—Dirk Wright
Attorney, Agent, or Firm—Thompson, Birch, Gauthier & Samuels

[57] ABSTRACT

A gearing unit with planetary gearing employs a load sensor in the form of a stationary pin provided with a strain gauge transducer easily accessible via a bore in its casing. A brake with respective plate carriers is associated with the planetary gearing. One of these carriers is held stationary with the aid of the load sensor while the other of the carriers meshes via teeth with a rotatable component of the gearing. During operation the carriers lock together to hold the component of the planetary gearing stationary to permit drive to be transmitted. The load sensor is then subjected to force proportional to the dynamic loading on the gearing and brake. In the event of overloading the carriers are disengaged by hydraulic force in response to a signal from the sensor to permit the planetary gearing component to rotate and thus interrupts the drive.

13 Claims, 3 Drawing Figures

GEARING UNITS FOR USE WITH MINING APPARATUS

FIELD OF THE INVENTION

The present invention relates to drive or gearing units for use with mining apparatus, such as coal ploughs and scraper-chain conveyors, and more particularly to overload protection of such units and apparatus.

BACKGROUND TO THE INVENTION

It is known to incorporate a load sensor on the output shaft of a drive unit and to use this sensor to operate a clutch to disconnect the output shaft from the input shaft in the event of an overload. German patent specification No. 3043237 (which has an equivalent GB No. 2088442) describes a drive or gearing unit of this type. U.S. patent application Ser. No. 563,487, filed Dec. 20, 1983 and assigned to the same assignee as the present application, desribes a modified protection system in which the response time is minimized. In the known systems, strain gauge transducers are normally mounted directly on rotating shafts and this presents considerable difficulties in the transmission of the electrical signals. Moreover, the operation of removing and replacing the transducers is laborious and time consuming.

A general object of the present invention is to provide an improved gearing unit with overload sensing and protection.

SUMMARY OF THE INVENTION

A drive unit according to the invention incorporates planetary gearing and stationary load sensing means for sensing the load transmitted by the gearing. A brake device serves selectively to lock a rotatable component of the gearing to permit drive to occur. The device has a normally stationary part, such as a plate carrier, which is associated with the load sensing means. Preferably this carrier is associated with means for holding the carrier stationary during use which means includes or embodies a load sensor. Another plate carrier engages via toothed engagement with the rotatable component of the planetary gearing and locks this when the plate carriers engage. A signal from the sensor can be assessed by a control device to determine loading and in the event of overloading the plate carriers can be disengaged by hydraulic force to interrupt the drive.

In a preferred construction, used particularly for high performance coal ploughs and conveyors, the planetary gearing forms one stage, such as output stage, of a gear train of the unit and a spur gearing stage is also provided. The load sensor may be a strain gauge type transducer incorporated on a removable pin which is easily and conveniently replaced without extensive dismantling of the unit. The load or torque transmitted by the unit can be assessed very accurately. Preferably, the brake device is located at or near the output shaft so that in the event of an overload the drive is interrupted at the output of the unit. In this way inertia does not adversely affect the operation of the protection system. Conveniently, the brake device is mounted in a protected position alongside the planetary gearing within the main gearing unit casing or housing or in an additional subhousing connected to the main housing.

The component of the planetary gearing, which is held stationary by the brake device, which includes or embodies a load sensor in accordance with the invention, is preferably a toothed ring having internal teeth meshing with the planetary gears, although it is possible to hold the planetary gear carrier stationary. The planetary gearing component may then mesh with the other clutch plate carrier via external teeth. This planetary gearing component may be rotatable in either direction and a preferred arrangement has a pair of simple pins carrying strain gauge transducers engaging directly or indirectly on diametrically opposed stop faces on the plate carrier of the brake device which is to be held stationary. The pin transducer can react against the main casing again either directly or indirectly. The stop faces can bear on the gauge pins through the provision of, for example, further intermediate pins. In this arrangement the direction of rotation of the drive is thus reversible. The use of an intermediate pin or pins is useful in that this permits better sealing of the interior of the casing and the replacement of the transducers does not involve any escape of lubricant.

The electrical signal from the or each transducer provided in the gearing unit in accordance with the invention can be used in a variety of ways to interrupt the drive or reduce the load. Preference is given however to the operation of a brake device as described previously with the aid of an electro-magnetic valve which permits hydraulic fluid to release the brake. An arrangement as described in the aforementioned U.S. patent application Ser. No. 563,487, herein incorporated by reference, can be utilised to optimize the response time. In contrast to known protection systems the load measuring means or sensor is associated with the stationary plate carrier so that the use of sliding contacts or the like is unnecessary. A cable or cables carrying the loadindication signal(s) can be conducted out of the casing housing the gearing quite easily. Likewise, the pressure fluid for release of the plate carriers in the event of overload can be conveyed via bores or channels in the stationary carrier or other stationary parts.

The other plate carrier, rotatably mounted in the casing, acts as a brake drum and can mesh with external teeth directly or indirectly with the planetary gearing component. The stationary carrier can have a flange, or can be mounted on a journal provided with such a flange, which has one or more stop faces as mentioned previously.

In a preferred construction a gearing unit in accordance with the invention comprising and input shaft, an output shaft, gearing at least including planetary gearing drivably interconnecting the input shaft to the output shaft, a clutch-brake device with one plate carrier coupled via toothed engagement with a rotatable component of the planetary gearing and another plate carrier held stationary with the aid of holding means including a load sensor providing a signal dependent on load transmitted through the gearing; wherein the plates of the brake device normally lock the carriers together to hold the rotatable component of the planetary gearing stationary to permit drive between the shafts and the signal from the load sensor is utilized to release the plates of the brake device and permit the rotatable component of the planetary gearing and said one carrier of the brake device to rotate to interrupt the drive in the event of overloading.

The invention also provides a drive unit for operating chain-driven mining equipment which has an overload protection system including a measuring device for sensing load transmitted through the gearing unit and control means for effecting overload protection in response to the measuring device; wherein the unit employs planetary gearing, the measuring device is stationary and replaceable, the control means has a brake which brakes a rotatable component of the planetary gearing to render the latter stationary, which acts on the measuring device and which is operable to release the rotatable component in the event of overloading to interrupt the drive.

The invention may be understood more readily, and various other features and aspects of the invention may become apparent, from consideration of the following description.

BRIEF DESCRIPTION OF DRAWINGS

An embodiment of the invention will now be described, by way of example only, with reference to the accompanying drawings wherein.

DESCRIPTION OF PREFERRED EMBODIMENT

Figure 1:
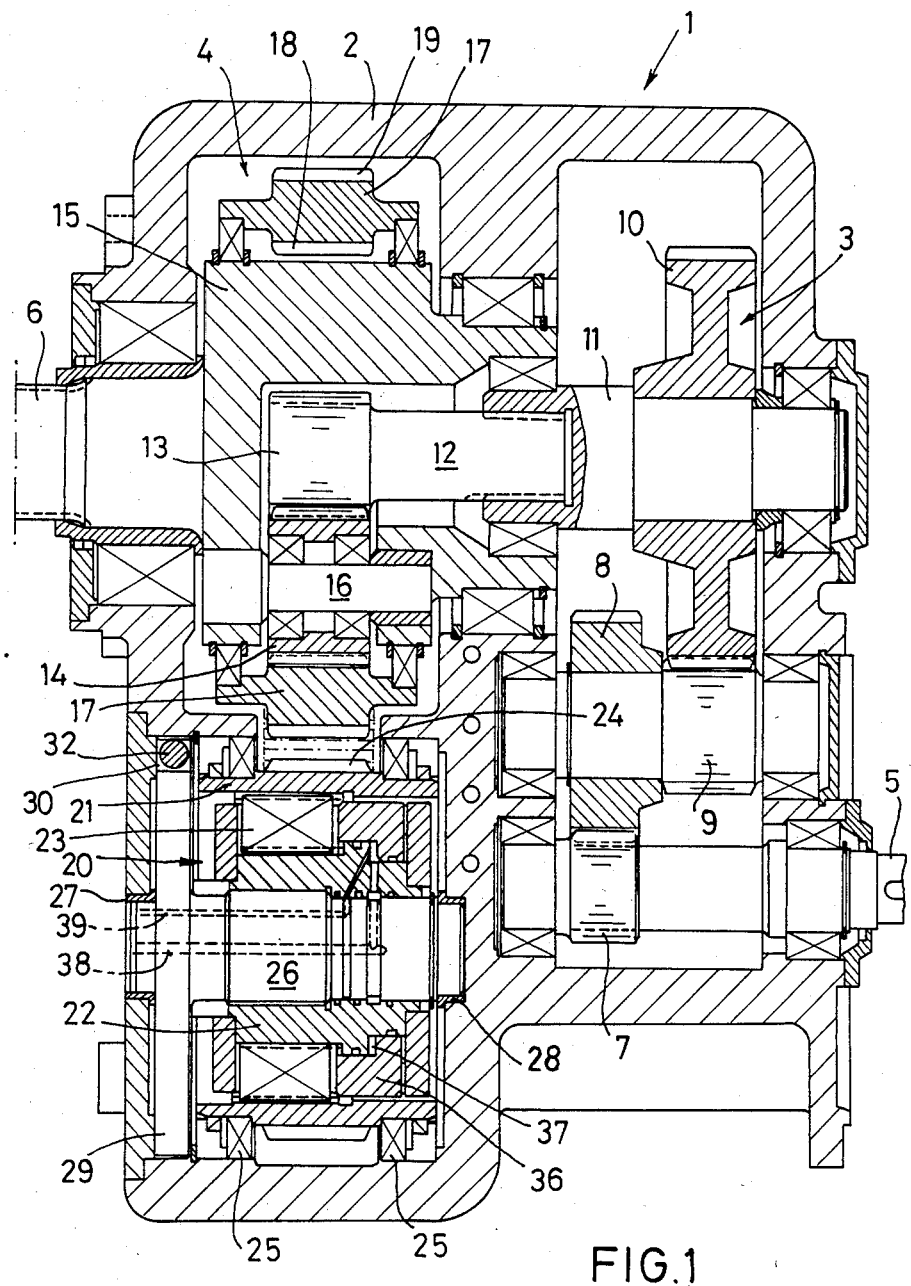
FIG. 1 is a schematic sectional side view of a gearing unit constructed in accordance with the invention.

The unit depicted in the accompanying drawings is intended primarily for driving chains of underground mining machinery, particularly coal ploughs and scraperconveyors. Such a drive or gearing unit generally designated 1 is composed of a gear train within a casing 2 and drivably interconnecting an input shaft 5 to an output shaft 6. During use the shaft 5 is driven by a motor or the like (not shown) while the shaft 6 may have a chain wheel (not shown) around which a chain driven by the unit is partly entrained. The gearing within a casing 2 is composed of a spur gearing stage 3 and a planetary gearing stage 4. The spur gearing stage 3 is composed of spur gears 7, 8, 9 and 10 and forms the input stage of the unit. The spur gear 7 is rotatably mounted on the shaft 5 and meshes with the spur gear 8. The spur gear 8 is carried on an intermediate shaft which also supports the spur gear 9 which in turn meshes with the spur gear 10. The spur gear 10 is rotatably mounted on a shaft 11 coaxial with the output shaft 6. A further shaft 12, on which is mounted a sun wheel 13 of the planetary gearing stage 4, is rotatably locked to the shaft 11. Planet wheels 14 mesh with the sun wheel 13 and are supported on individual rotatable shafts 16 mounted on a carrier 15. A toothed ring 17 is disposed co-axially with the shafts 6, 12, 11 and has internal teeth 18 which mesh with the planet wheels 14. The ring 17 also has external teeth 19. The carrier 15 is drivably connected to the output shaft 6. The planetary gear stage 4 is associated with a selectible coupling device which can be operated to disconnect the drive to the output shaft 6. More particularly, this device is designed to operate as a brake 20 which is located alongside the planetary gearing 4. The brake 20 is composed of complementary carriers 21, 22 and a stack of discs or plates 23 which are alternately mounted to the carriers 21, 22 as by keying. These plates 23 are axially displaceable and subjected to the action of a spring device (not shown) which normally urges the plates 23 into face-to-face contact to couple the carriers 21, 22 together. The outer carrier 21 constitutes a brake drum and has external teeth 24 which mesh with the external teeth 19 on the ring 17 of the planetary gearing stage 4.

Figure 2:
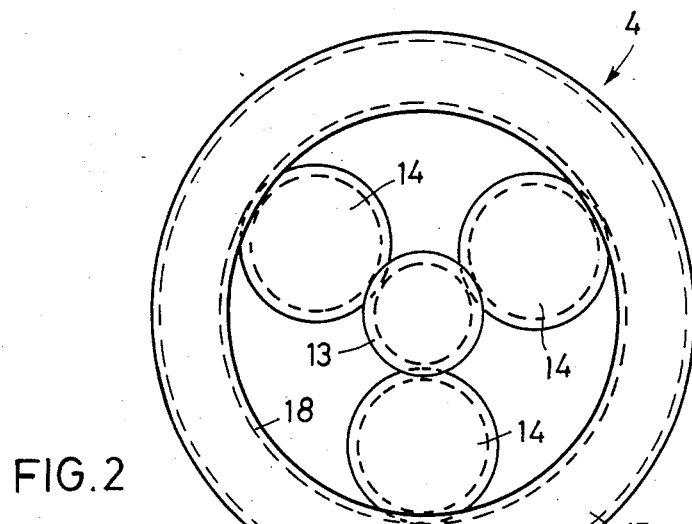
FIG. 2 is a simplified diagramatic representation of part of the unit shown in FIG. 1.
Figure 3:
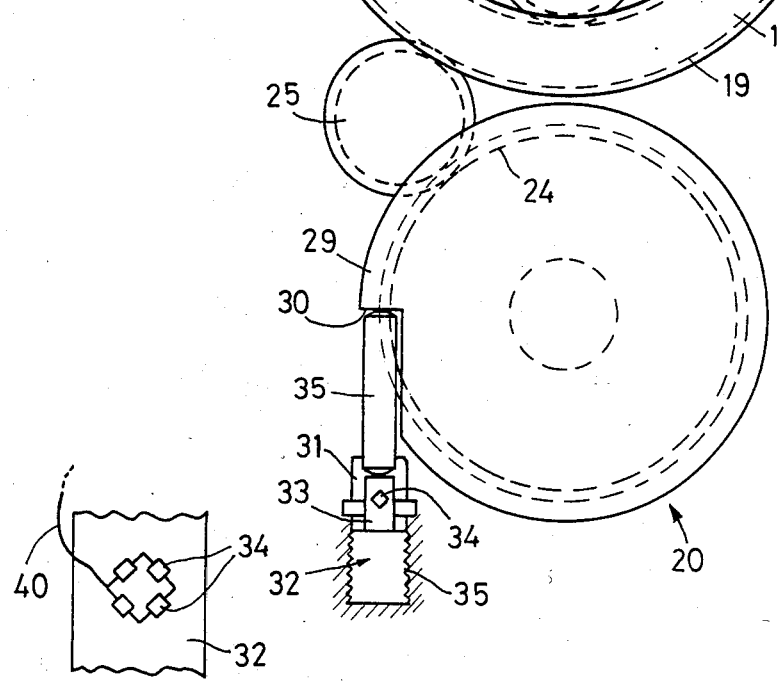
FIG. 3 is an enlarged diagramatic representation of load measuring means used in the unit shown in FIGS. 1 and 2.

Although it is possible to have the teeth 19 and 24 in direct engagement, FIG. 2 shows the use of a small intermediate gear 25 which mutually meshes with the teeth 19 and 24. The carrier or brake drum 21 is supported for rotation by bearings 25 within the casing 2. The carrier 22 is supported on a journal 26 which in turn is mounted in bearings 27, 28 in the casing 2. The journal 26 has a flange 29 which is cut away at its outer periphery to form a radial stop face 30. The housing 2 is formed with a chamber 31 which receives a load measuring means or sensor 34. More particularly, the chamber 31 receives a pin 32 which has an external threaded portion 35 screwed into an internal thread leading from the chamber 31 to the exterior. An inner reduced portion 33 of the pin 32 carriers the load measuring sensor or transducer 34. This transducer 34 can take the form of a single strain gauge but it is preferred to use multiple gauges. Thus, FIG. 3, shows a transducer 34 in the form of a bridge composed of four strain gauges positioned diagonally to the axis of the pin 32. An intermediate pin 35 engages between the inner end of the pin 32 and the stop face 30 of the flange 29. The axis of the pins 32, 35 extend generally tangentially to the flange 29.

When the spring device compresses the plates 23 to lock the carriers 21, 22 together, the carrier 22 is held with the aid of these pins 32, 35 engaging on the stop face 30. The carriers 21, 22 are thus locked in position to secure the ring 17 in a stationary position to permit drive through the planetary gearing stage 3 to the shaft 6. Where the direction of rotation of the drive to the input shaft 5 is reversible the flange 29 would be provided with diametrically opposed stop faces 30 each of which is held by pins 35, 32 as illustrated to restrain the ring 17 from rotating in either direction and provide load sensors for both directions of rotation.

The carrier 22 supports an axially-displaceable pressure ring 36 and a pressure chamber 37 for receiving pressure fluid is established between the ring 36 and the flange 29 associated with the carrier 22. When the pressure chamber 37 receives pressure fluid, the ring 36 is displaced to oppose the action of the spring device thereby to release the plates 23 and permit the ring 17 to rotate. The pressure chamber 36 is connected via channels 38 and 39 with a source of a hydraulic pressure controlled with an electro-hydraulic control device. The channels 38, 39 take the form of axial and radial borings within the journal 26 and in a hub-like portion of the carrier 22. When the electro-hydraulic control device isolates the pressure chamber 37 from the source of pressure fluid, the brake 20 functions as described hereinbefore to hold the ring 17 of the planetary gear stage 4 stationary. As the planetary gearing operates to drive the shaft 6, the associated load measuring transducer 34 is subjected to force which cause elastic deformation of the gauges in proportion to the load or torque passing through the output shaft 6. The transducer 34 provides an electrical signal on a cable 40 (FIG. 3) which controls the electro-hydraulic control device. Should this signal signify an overload, the control device will operate to connect the source of hydraulic fluid to the chamber 37. The pressure fluid admitted to the chamber 37 will then release the clutch 20 to permit the carrier ring 17 to rotate together with the carrier 21 of the clutch 20.

As described in the aforementioned U.S. patent application Ser. No. 563,487 (herein incorporated by reference) the response time of the overload protection system can be minimized to be not than about 20 milliseconds and more preferably below 10 milliseconds. When the brake 20 holds the ring 17 stationary continuous circulation of pressure fluid can occur through the channels 38, 39 so that a certain pre-selected pressure is maintained in the chamber 37 again as described in the aforementioned U.S. patent application.

I claim:

1. A drive unit for use with mineral mining apparatus; said unit comprising a housing, an input shaft extending into the housing, an output shaft extending into the housing, gearing at least including planetary gearing, within the housing drivably interconnecting the input shaft to the output shaft, a rotatable component of the planetary gearing which when held stationary permits drive to be transmitted through the gearing and when released to rotate interrupts the drive, brake means for selectively holding the rotatable component of the planetary gearing stationary, said brake means being composed of a first plate carrier and a second plate carrier, biasing means for causing the plates of the carriers to engage one another to rotatably lock the carriers together, a pressure chamber for receiving hydraulic fluid used to oppose the biasing means and to disengage the plates of the carriers, a toothed coupling drivably interconnecting the first plate carrier to the rotatable component of the planetary gearing, holding means for holding the second plate carrier stationary in relation to said housing, a load sensor incorporated in the holding means for providing an electrical signal indicative of loading, and means responsive to said signal to provide fluid to flow to the pressure chamber to release the rotatable component of the planetary gearing in the event of overloading.

2. A unit according to claim 1, wherein the gearing also has a spur gearing stage.

3. A unit according to claim 1, wherein the load sensor is a pin carrying a strain gauge transducer.

4. A unit according to claim 1, wherein the rotatable component of the planetary gearing coupled to said first plate carrier is a toothed outer ring meshed with planet wheels thereof.

5. A unit according to claim 1, wherein the load sensor is a pair of pins each carring a strain gauge transducer.

6. A unit according to claim 5, wherein each pin is positioned within a chamber formed in the housing for easy removal and replacement.

7. A unit according to claim 1, wherein the rotatable component of the planetary gearing has internal teeth meshed with the planet wheels and external teeth which form part of the toothed coupling with said first plate carrier.

8. A unit according to claim 3, wherein the pin is positioned within a chamber formed in the housing for easy removal and replacement.

9. A unit according to claim 1, wherein the second plate carrier of the brake means is associated with a flange provided with a stop face subjected to the action of the holding means.

10. A gearing unit according to claim 3, wherein the second plate carrier of the brake is associated with a flange provided with a stop face which engages on said pin via an intermediate pin which transmits thrust force to the pin carrying the transducer.

11. A gearing unit according to claim 3, wherein said pin has an outer portion forming a screw-threaded plug engaged in a threaded bore within the housing.

12. A gearing unit according to claim 1 and further comprising a control device which receives the signal from the load sensor and initiates the flow of hydraulic fluid into the pressure chamber in the event of overloading.

13. A gearing unit according to claim 1, wherein the planetary gearing forms an output gearing stage and the brake means is located alongside the planetary gearing.

* * * * *